United States Patent
Kreuter

[11] Patent Number: 5,809,784
[45] Date of Patent: Sep. 22, 1998

[54] METHOD AND APPARATUS FOR CONVERTING RADIATION POWER INTO MECHANICAL POWER

[75] Inventor: Peter Kreuter, Aachen, Germany

[73] Assignee: Meta Motoren- und Energie-Technik GmbH, Herzogenrath, Germany

[21] Appl. No.: 611,448

[22] Filed: Mar. 1, 1996

[30] Foreign Application Priority Data

Mar. 3, 1995 [DE] Germany .................. 195 07 511.0

[51] Int. Cl.⁶ .................... F01K 25/02; B60K 16/00; F03G 6/00; F01B 29/08
[52] U.S. Cl. .................. 60/650; 60/508; 60/516; 60/641.8; 60/641.13; 60/641.14; 165/4
[58] Field of Search .................. 60/641.8, 641.13, 60/641.14, 641.15, 508, 509, 515, 516, 645, 650, 669; 62/6; 165/4, 45

[56] References Cited

U.S. PATENT DOCUMENTS

| | | | |
|---|---|---|---|
| 442,670 | 4/1890 | Goldman | 60/517 |
| 2,395,984 | 3/1946 | Bartholomew | 60/515 |
| 2,429,035 | 10/1947 | Steving, Jr. | 60/645 |
| 3,861,166 | 1/1975 | Goldsberry | 62/115 |
| 4,077,221 | 3/1978 | Maeda | 60/650 |
| 4,094,146 | 6/1978 | Schweitzer | 60/641.14 |
| 4,135,367 | 1/1979 | Frosch et al. | 60/641 |
| 4,173,123 | 11/1979 | Gurtler | 60/641.13 |
| 4,263,895 | 4/1981 | Colao | 126/586 |
| 4,270,351 | 6/1981 | Kuhns | 60/517 |
| 4,306,414 | 12/1981 | Kuhns | 60/510 |
| 4,326,381 | 4/1982 | Jensen | 60/641.14 |
| 4,414,812 | 11/1983 | Parry | 60/641.14 |
| 4,452,047 | 6/1984 | Hunt et al. | 60/641.15 |
| 4,642,988 | 2/1987 | Benson | 60/641.14 |
| 4,666,376 | 5/1987 | Solomon | 417/379 |
| 4,676,068 | 6/1987 | Funk | 60/641.14 |
| 4,821,516 | 4/1989 | Isshiki | 60/517 |
| 4,876,854 | 10/1989 | Owens | 60/641.8 |
| 4,881,372 | 11/1989 | Naito | 60/521 |
| 5,016,441 | 5/1991 | Pinto | 60/516 |
| 5,404,723 | 4/1995 | Parker et al. | 60/641.15 |

FOREIGN PATENT DOCUMENTS

| | | |
|---|---|---|
| 2909211 | 9/1980 | Germany . |
| 3109681 | 9/1982 | Germany . |
| 3238797 | 5/1984 | Germany . |
| 2060781 | 5/1981 | United Kingdom . |

OTHER PUBLICATIONS

Kraftfahrtechnisches Taschenbuch; Robert Bosch GmbH; 1991; pp. 406–407.

Primary Examiner—Ira S. Lazarus
Assistant Examiner—Ljiljana V. Ciric
Attorney, Agent, or Firm—Robert W. Becker & Associates

[57] ABSTRACT

A method and apparatus for converting radiation power, especially solar radiation, into mechanical power. A piston is provided that is movable in a cylinder accompanied by the formation of a variable-sized working chamber. During a compression stroke, the piston is used to press a working medium, accompanied by a reduction in the size of the working chamber, into a radiation absorber/heat exchanger that is disposed directly in the working chamber, receives radiation energy, and essentially completely accommodates the working medium when the working chamber is at a minimum. During a working stroke, the working medium, which is compressed by the reduction in size of the working chamber and which is heated up by absorbing thermal energy from the radiation absorber/heat exchanger, is used to move the piston, upon expansion of the working medium, into a position that enlarges the working chamber. At least a portion of the working medium is exchanged following the working stroke and prior to a subsequent compression stroke.

27 Claims, 7 Drawing Sheets

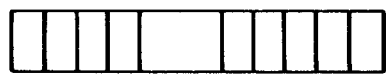
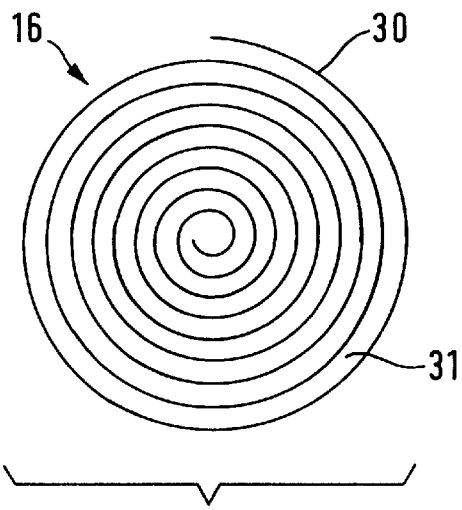
Fig. 5a
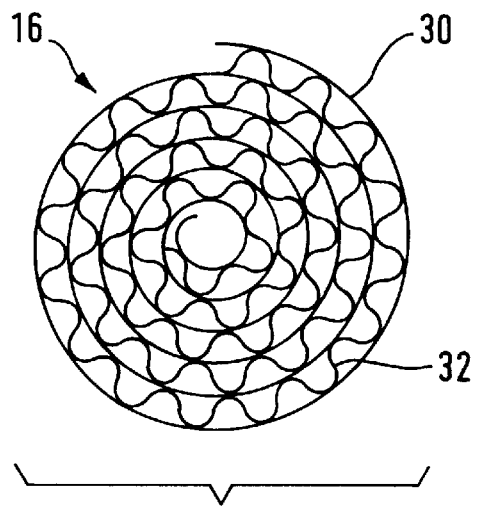
Fig. 5b
Fig. 5c
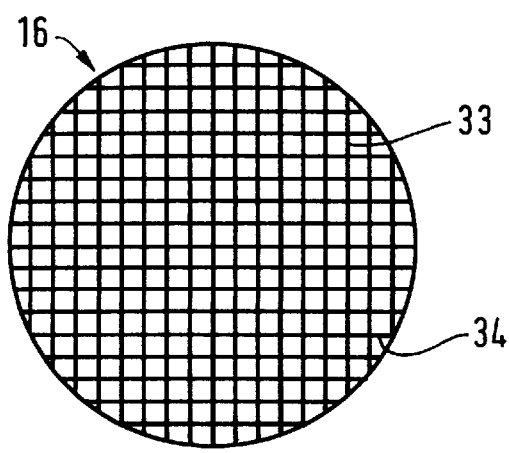
Fig. 5d
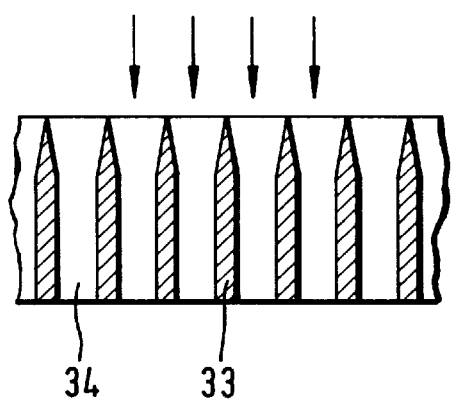

METHOD AND APPARATUS FOR CONVERTING RADIATION POWER INTO MECHANICAL POWER

BACKGROUND OF THE INVENTION

The present invention relates to a method and apparatus for converting radiation power, especially solar radiation, into mechanical power. A piston is provided that is movable in a cylinder accompanied by the formation of a variable-sized working chamber; upon expansion in the working chamber of a working medium that is heated with radiation energy, the piston is moved from a first position in which the working chamber is at a minimum to a second position in which the working chamber is at a maximum.

With the objective of converting the power or energy contained in solar radiation into mechanical energy, work is being done on Stirling engines (see Kraftfahrtechnisches Taschenbuch, Robert Bosch GmbH, volume 21, VDI-Verlag, 1991, page 406). Such Stirling engines, in which gaseous working medium is pressed back and forth between two working chambers through a cooler, regenerator, and heater that is acted upon by radiation, theoretically operate with degrees of useful power efficiency of up to 30%. However, the structural expense that is required is considerable. Whether the future production of mechanical power or electrical energy is to be effected by means of Stirling engines or photovoltaic installations is a question that is still to be decided. With both methods, pursuant to the present state of the art, such high levels of capital investment are required in relation to the useful power or current that is generated, that it is only in exceptional cases that economic viability is obtained, at least as long as fossil fuels are still used for producing energy.

It is therefore an object of the present invention to provide a method and apparatus for converting radiation power, especially solar radiation, into mechanical power, with this being achieved at a reduced structural expenditure relative to the state of the art.

BRIEF DESCRIPTION OF THE DRAWING

This object, and other objects and advantages of the present invention, will appear more clearly from the following specification in conjunction with the accompanying schematic drawings, in which:

FIGS. 5a–5k illustrate specific embodiments for radiation, radiation absorbers and heat exchange.

SUMMARY OF THE INVENTION

Figure 1:
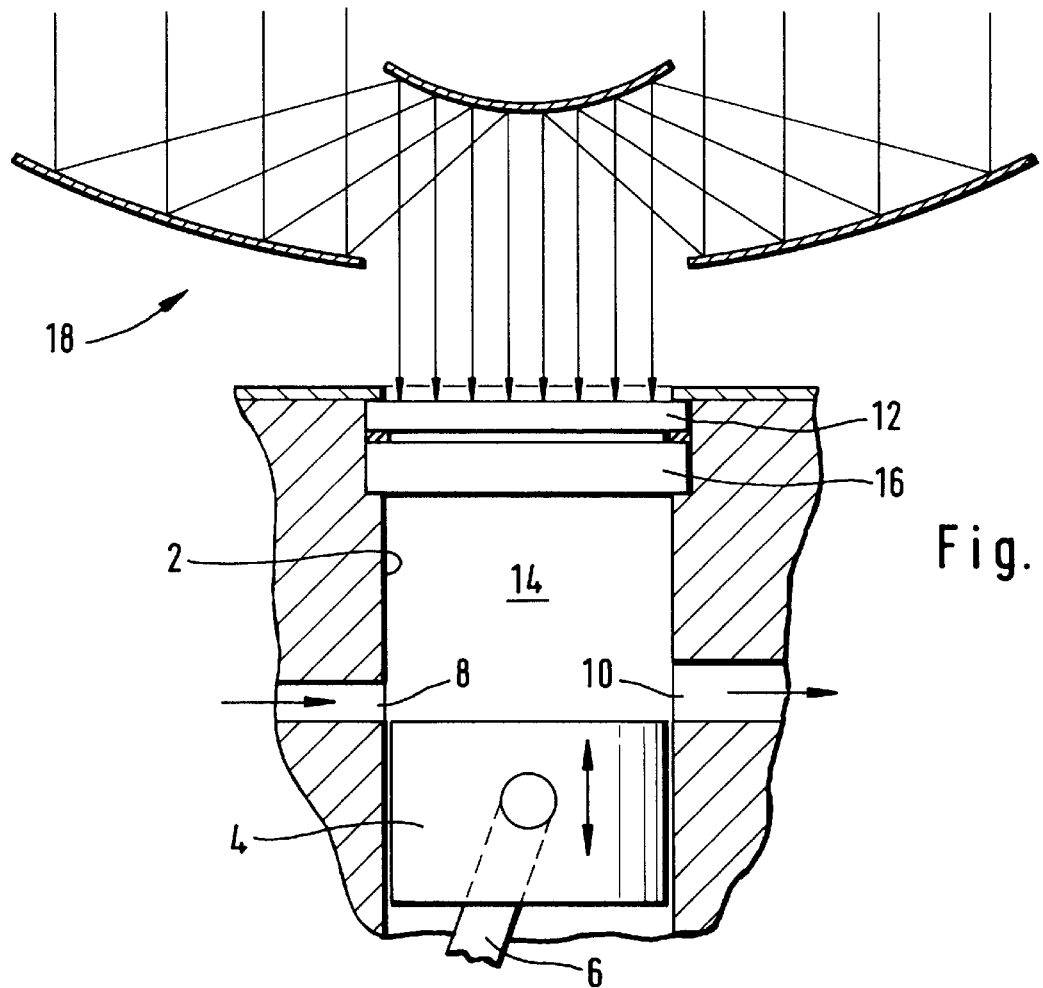
FIG. 1 is a view illustrating the principle of one exemplary embodiment of the apparatus of the present invention.

The method of the present invention is characterized primarily by the steps of: during a compression stroke, using the piston to press a working medium, accompanied by a reduction in the size of the working chamber, into a radiation absorber and heat exchanger that is disposed directly in the working chamber, receives radiation energy, and essentially completely accommodates the working medium when the working chamber is at a minimum; during a working stroke, using the working medium, which has been compressed by the reduction in size of the working chamber and which has been heated up by absorbing thermal energy from the radiation absorber and heat exchangers, to move the piston, upon expansion of the working medium, into a position that enlarges the working chamber; and exchanging at least a portion of the working medium following the working stroke and prior to a subsequent compression stroke.

The method of the present invention operates in a similar manner to a conventional engine in an open process in which the working medium is heated directly in the working chamber and the heat is converted into mechanical power. Accordingly, an apparatus that has a straightforward construction and that is provided with proven reliable structural elements of conventional engines can be used for carrying out the inventive method.

Pursuant to one preferred embodiment, the working medium can be ambient air, which is available everywhere and which, with the exception of the temporary heating effect, experiences no changes, so that the inventive method is extremely environmentally friendly. The method of the present invention can be carried out in a manner similar to a conventional two-stroke process, with the difference that the energy is supplied to the working medium not by combustion but rather directly in the form of radiation energy that is stored in the radiation absorber/heat exchanger.

Two possible ways of controlling the inventive method, even in combination with one another, include controlling the delivery of mechanical power by the piston by varying the amount of the working medium that is exchanged in each working cycle, and/or conducting the working medium in a circuit and adapting the pressure of the working medium that exists in the circuit to operating parameters.

Pursuant to another specific embodiment of the inventive method, the working medium that flows out of the working chamber after a working cycle can be passed to a heat exchanger. In this way, the portion of the radiation energy that is not converted into mechanical work can be used in the form of low-temperature heat, for example for heating purposes.

The apparatus of the present invention is characterized primarily by: a cylinder in which, for delivering mechanical power, is disposed a piston that is reciprocally movable for forming a variable-size working chamber, wherein the cylinder is provided with at least one controllable inlet port and at least one controllable outlet port for the supply and discharge of a gaseous working medium to and from the cylinder respectively, wherein an end face of the cylinder remote from the piston is embodied for the introduction of radiation absorber and heat exchanger having a heat exchange surface that is disposed in the working chamber such that when the working chamber is at a minimum the working medium is accommodated essentially entirely in the radiation absorber and heat exchanger; and a scavenging blower for an at least partial exchange of the working medium in the working chamber during each working cycle.

Further specific features of the present invention will be described in detail subsequently.

DESCRIPTION OF PREFERRED EMBODIMENTS

Referring now to the drawings in detail FIG. 1 shows an engine having a cylinder 2 in which a piston 4 can be moved upwardly and downwardly; the piston is connected by means of a connecting rod 6 to a non-illustrated crankshaft. Above the bottom dead center position of the piston 4, the cylinder is provided with an inlet port 8 and an outlet port 10, which are respectively opened and closed off directly by the movement of the piston 4.

The design and construction of the aforementioned components can be substantially similar to a conventional two-stroke engine. However, in contrast to conventional engines, that end face of the cylinder 2 that is remote (or opposite) from the piston 4 is closed off by means of a disk or plate 12 that is substantially transparent or transmissive for solar radiation as far as possible over the entire spectrum thereof, allows for little reflection of solar radiation at its surface, is resistant to high temperatures, and withstands high pressures. Further requirements of the disk 12 will be described subsequently. The disk 12 is advantageously made of quartz glass. Disposed on the inner side of the disk 12, within the working chamber 14 that is formed between the disk 12 and the piston 4, is a radiation absorber and heat exchanger 16, which will hereinafter be referred to as a converter; the construction of the converter will be described in greater detail subsequently in connection with FIG. 5. The purpose of the converter 16 is to convert the energy that is contained in the radiation that enters through the disk 12 into heat, and to transfer this heat to the working medium that in the top dead center position of the piston 4 is disposed substantially entirely in the converter 16.

Disposed above the disk 12 is a radiation focusing device 18 that focuses the solar radiation onto the disk 12 so that the solar radiation passes into the converter 16. Since such radiation focusing devices are known per se, they will not be discussed in detail in this application. It is to be understood that the cylinder 2 could also be arranged in such a way that the radiation that is focused in reflectors passes through the disk 12 from below. It is also to be understood that an engine having several cylinders 2 can be provided, with the pistons thereof operating on a common crankshaft. Those regions of such an engine disposed between the disks 12 are then advantageously cooled (for example watercooled), if it is not possible for the radiation to be cleanly focused onto the disks 12, so that the portion of the radiation that strikes this part of the engine can be utilized as thermal energy. It is furthermore to be understood that a radiation focusing device for focusing solar radiation does not necessarily have to be provided outside the disk 12. For example, a burner or radiation device, the radiation energy of which acts upon the disk 12, can be provided outside the disk 12.

The radiation transmissivity of the disk 12 is advantageously matched to the respective application. When utilizing solar radiation, for example, as indicated, it is advantageous for the disk to be as transmissive as possible for the wave lengths of solar radiation so that the solar radiation heats up the converter 16 with maximum efficiency, whereas for the radiation emitted by the hot converter the disk 12 should have a maximum reflectivity so that the thermal energy remains in the working chamber 14. This is achieved by appropriate selection of the material and also possibly by coating the disk 12.

Figure 2:
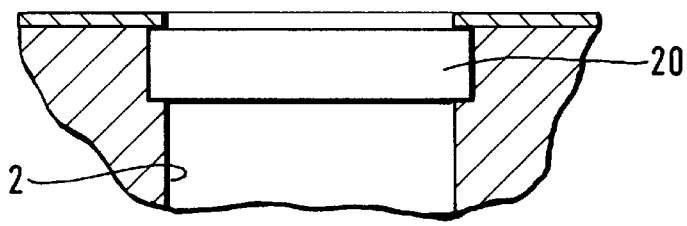
FIG. 2 shows a modification of the apparatus of FIG. 1.

The cylinder 2 illustrated in FIG. 2 is distinguished from that of FIG. 1 essentially in that the disk 12 and the converter 16 are combined to form a component 20.

Figure 3:
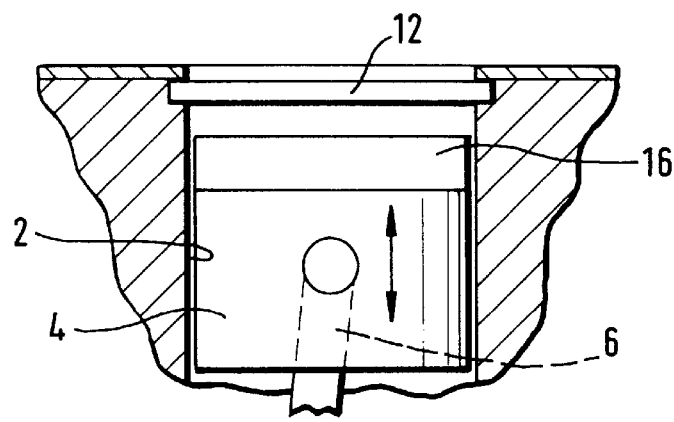
FIG. 3 shows a further modification of the apparatus of FIG. 1.

The embodiment of FIG. 3 differs from that of FIG. 1 essentially in that the converter 16 is fixed directly to the piston 4.

Figure 4:
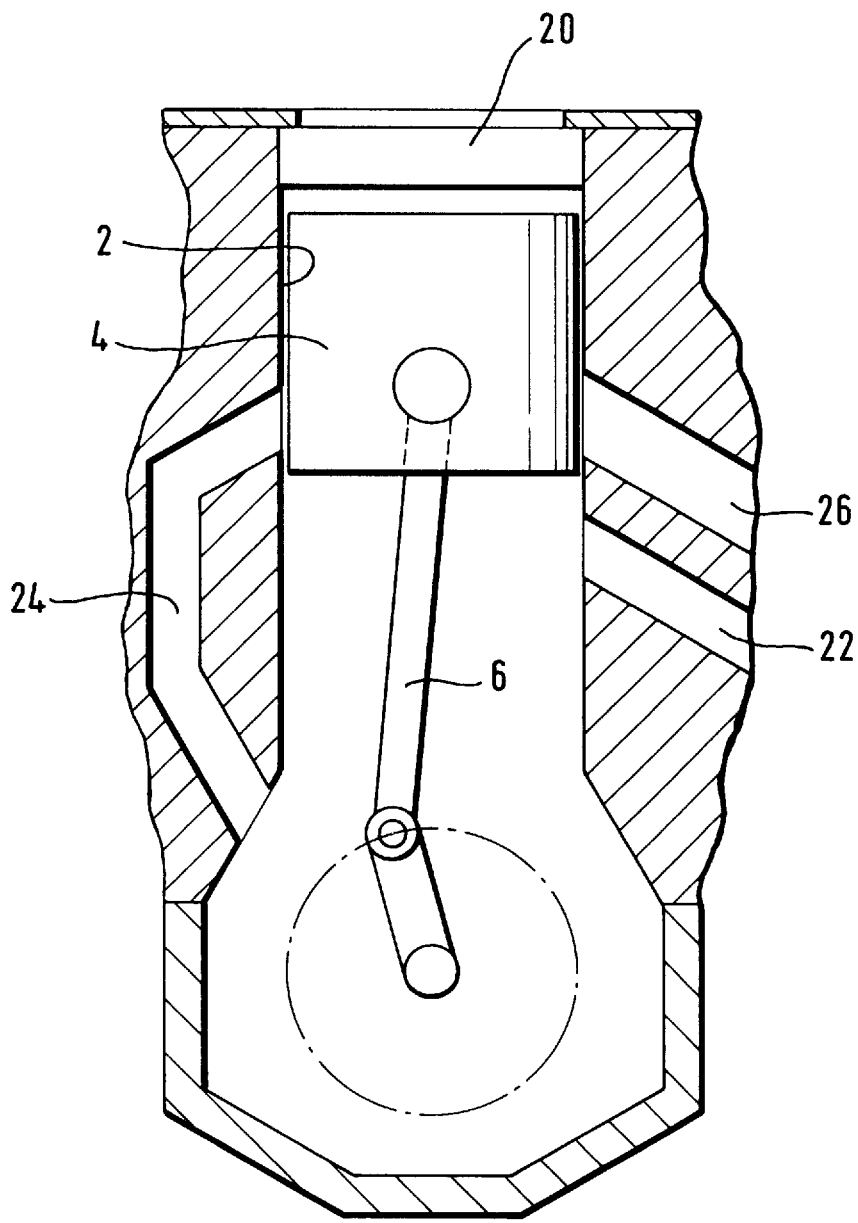
FIG. 4 shows a crankcase scavenging system as it can be used for the apparatus of the present invention.

FIG. 4 illustrates an embodiment of a cylinder with its associated crank drive. The mechanism of this construction corresponds to a conventional two-stroke engine that has crankcase scavenging. For this purpose, an inlet conduit 22 opens into the crankcase. A flow transfer conduit 24 extends from the crankcase into the cylinder 2 and opens out approximately opposite the port of an outlet conduit 26. The ports of the conduits 22, 24 and 26 are disposed in such a way that toward the end of the compression stroke of the piston 4, fresh air is drawn into the crankcase, is compressed during the downward movement of the piston, and toward the end of the downward movement passes through the flow transfer conduit 24 into the working chamber, from which the expanded working medium flows out through the outlet conduit 26. It is to be understood that the flow of the working medium could also be controlled in some other fashion, for example by means of valves, sliders, etc.

FIG. 5 shows exemplary embodiments of the converter 16 and the component 20.

Figure 5E:
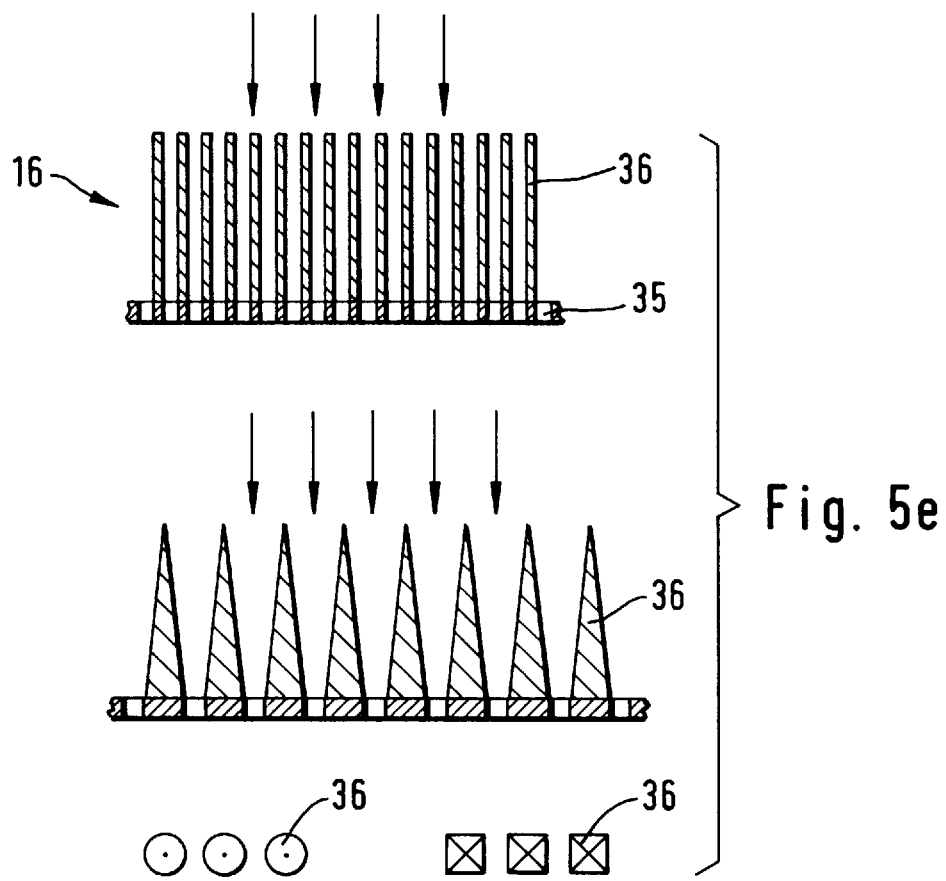

The converter 16 is intended to form a "black body" for the incident radiation. In other words, the converter is to absorb the instant radiation to the maximum extent and is to thereby heat up. On the other hand, toward the end of the compression stroke of the piston 4, the converter 16 is to the maximum extent possible supposed to deliver the energy stored therein to the working medium, especially air, that toward the end of the compression stroke is to the maximum extent disposed in the converter 16 for an effective heat exchange. For this purpose, the converter 16 is advantageously embodied in such a way that it has a high heat conductivity or a capacity to conduct high levels of heat flow, a large surface area on the one hand for receiving the radiation and on the other hand for delivering the stored energy, as well as a defined volume. The advantageous embodiments are, for example, a converter 16 in the form of a spirally wound metal sheet where the axis of the spiral is parallel to the axis of the cylinder (FIG. 5a), in the form of a spirally wound metal sheet having a corrugated sheet disposed between the spiral sheet (FIG. 5b), in the form of a body comprised of web plates disposed within one another (FIG. 5c), in the form of a body having, for example, steel wool disposed between two cover layers that can be embodied as perforated plates or wire meshes (FIG. 5d), or also in the form of wire mesh (FIG. 5e). It will be appreciated that numerous other embodiments for the converter would also be conceivable as long as they fulfill the described basic requirements.

The converter 16 can be spaced slightly from the disk 12 and the overall arrangement, including the piston 4, can be asymmetrical such that during the compression stroke of the piston 4, the working medium flows through the converter 16, for example in the form of a turbulent or eddy flow, thereby ensuring that the air that is compressed in the part of the converter 16 that is the hottest part because it is the uppermost part in FIG. 1 does not remain there.

Disposing the converter 16 directly on the piston, as shown in FIG. 3, has the advantage that the part of the converter that is uppermost and at the same time is the hottest is in the most effective heat exchange with the air that is urged into the converter 16 during the compression stroke, which has an advantageous influence upon the level of efficiency of the apparatus. A drawback of this arrangement is that the radiation must be focused extremely well, in other words must be directed in a parallel manner, so that it impinges entirely upon the converter 16 and does not heat up the cylinder wall. It will be appreciated that in this embodiment of the converter 16, the ports 8 and 10 are advantageously not disposed in the manner illustrated in FIG. 1, but rather open out into the upper region of the working chamber 14 and are controlled by means of valves.

FIGS. 5a to 5k illustrate various specific embodiments of the converter 16, with the embodiments of FIGS. 5a to 5i being used together with a disk 12 while the embodiments 5j and 5k require no disk.

Figure 5F:
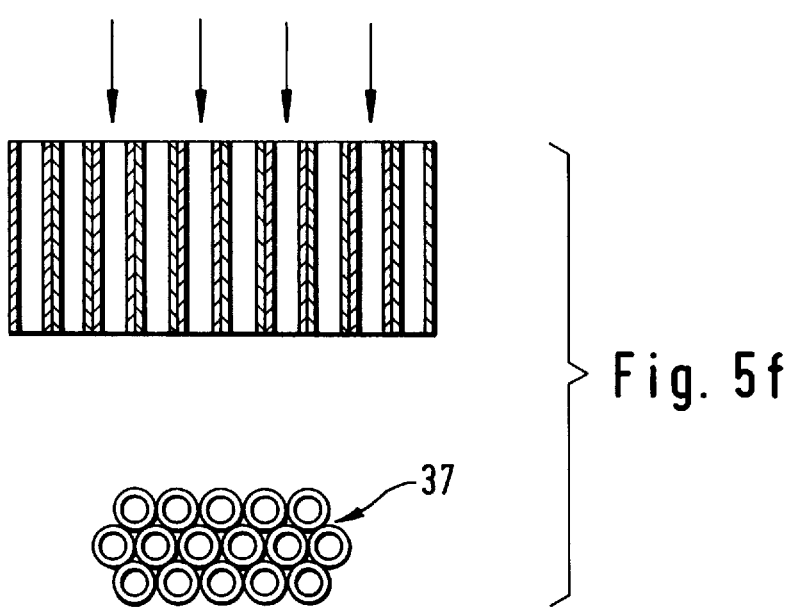
Figure 5G:
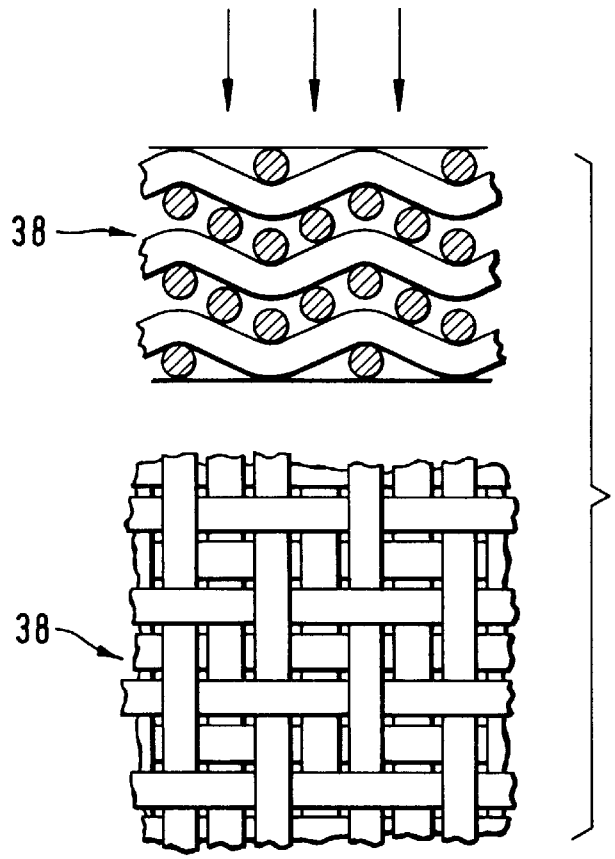
Figure 5H:
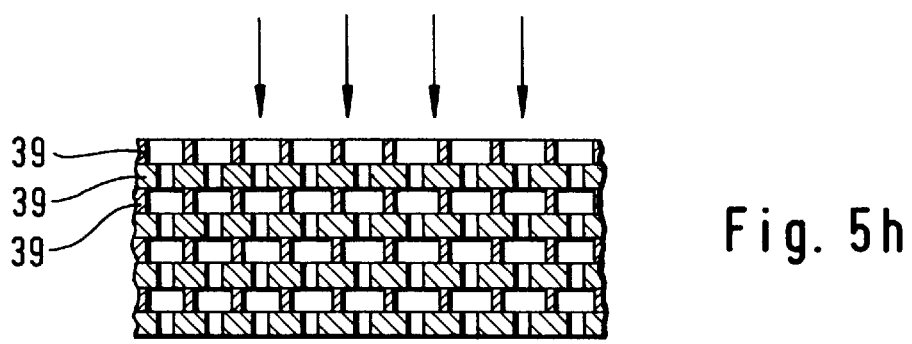
Figure 5I:
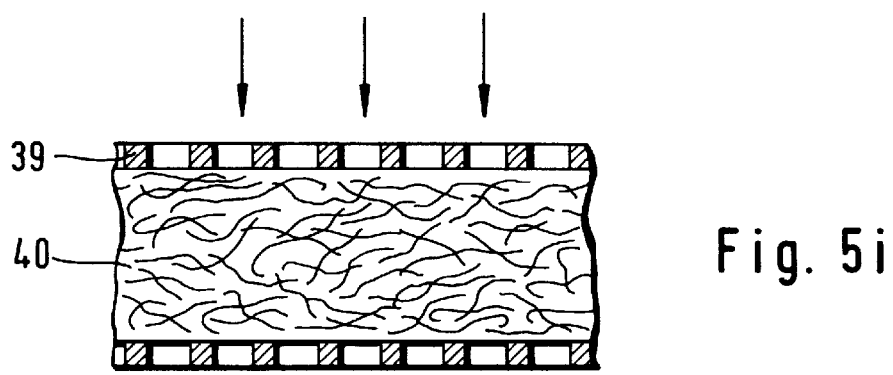

Pursuant to FIG. 5a, the converter is formed by a spiral sheet metal strip 30 so that intermediate spaces 31 are formed between the individual turns and are parallel to the axis of the cylinder and are open at both sides. With the embodiment of FIG. 5b, a corrugated metal sheet 32 is inserted between the turns of the sheet metal strip to increase the surface area of the converter 16. In the embodiment of FIG. 5c, the converter 16 is formed by metal sheets or plates 33 that are disposed at right angles to one another in the form of web sheets and which between them define channels 34 that are parallel to the axis of the cylinder and are open on both sides. In order to increase the level of efficiency, the sheets of the embodiment of FIG. 5d are advantageously tapered to a point toward the radiation side. In the embodiment of FIG. 5e, the converter is formed by an apertured or perforated plate 35 or metal sheet from which bars 36 project toward the radiation side; the bars have different cross-sectional areas and are advantageously tapered to a point toward the radiation side. In the embodiment of FIG. 5f, the converter 16 is formed by a tube bundle 37, the tubes of which are open at both ends and abut one another on their outer surfaces, thereby possibly forming further through passages. In the embodiment of FIG. 5g, the converter 16 is formed by a wire mesh 38. In the embodiment of FIG. 5h, perforated plates or metal sheets 39 are stacked upon one another, with the holes thereof being axially aligned relative to one another but advantageously having different diameters. In the embodiment shown in FIG. 5i, a wire mesh 40 is accommodated between two perforated plates 39.

Figure 5J:
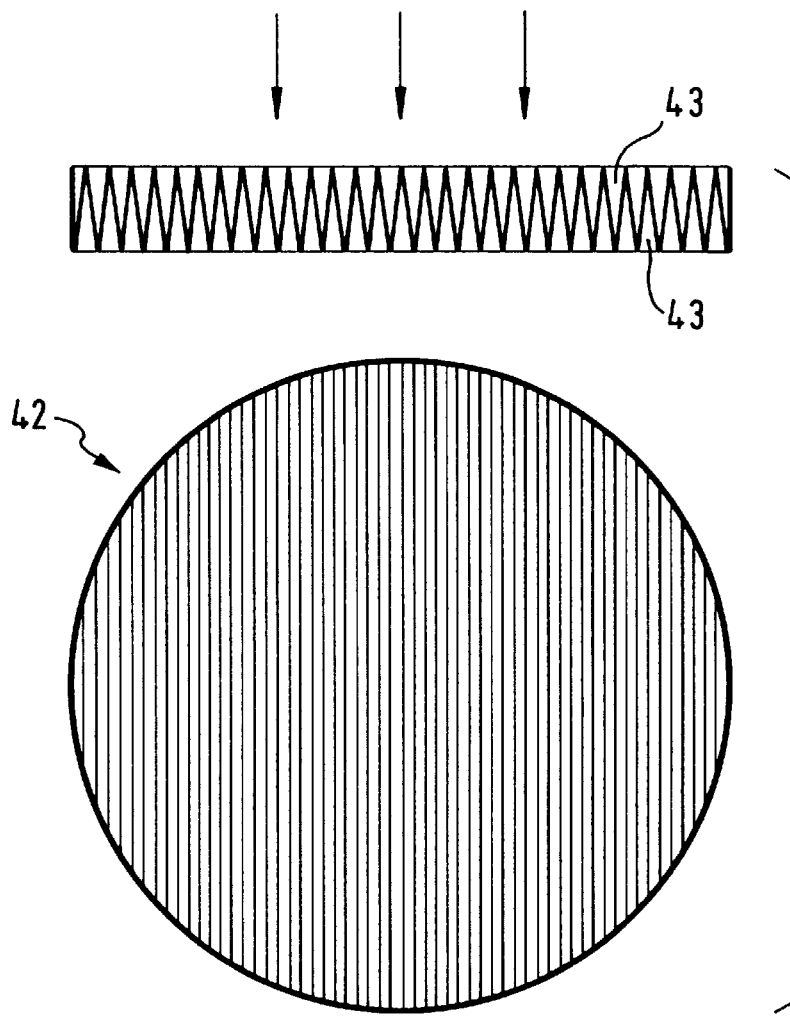
Figure 5K:
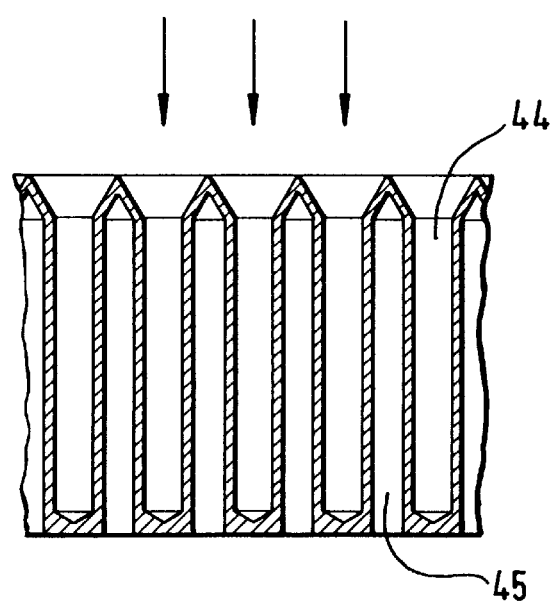

FIGS. 5j and 5k show embodiments of converters 42 that operate without a disk 12. The converter 42 of FIG. 5j is formed by a plate or sheet metal that is inherently stable and is folded in an accordion-like configuration to form bag-like bulges 43 that are closed on one side and are disposed in such a way that they start alternatingly from the radiation side and from the piston side. The embodiment of FIG. 5k provides recesses or blind passages 44 that are alternatingly open toward the radiation side and the toward the piston side, and which form an extremely large heat exchanger surface area. It will be appreciated that the crosssectional area of the blind passages 45 is advantageously less than that of the blind passages 44, with the latter having to temporarily accommodate the working medium. It is also to be understood that the cross-sectional area of those passages that are open toward the radiation side can increase toward the radiation, and that the illustrated meander-like cross-sectional configuration can be pointed toward the radiation side.

Figure 6:
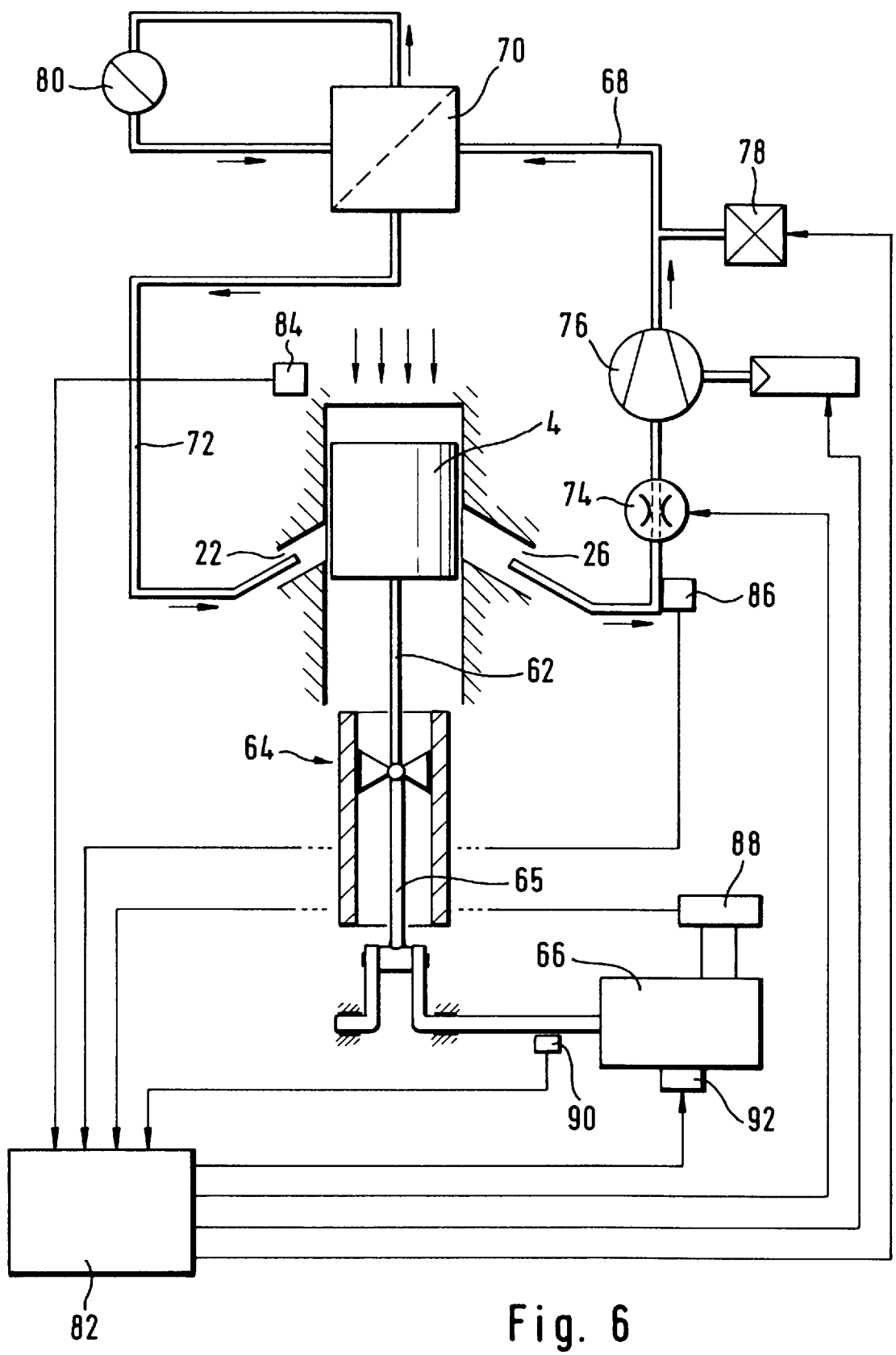
FIG. 6 shows an overall view of an apparatus having control means.

FIG. 6 shows an overall arrangement of one exemplary embodiment of the inventive apparatus. In this embodiment, the piston 4 has a piston rod 32 that leads via a crosshead guide 64 to the connecting rod 65, that is connected by means of a crankshaft to a generator 66 for generating electricity. The outlet conduit 26 is connected via a line 68 with a heat exchanger 70, which in turn is connected via a further line 72 to the inlet conduit 22. Disposed in the line 68 is a throttle 74, a scavenging blower 76, and a connection to an intake/venting valve 78. In the heat exchanger 70, the exchanged thermal energy can be discharged to a consumer 80. To control or regulate the previously described apparatus, a control means 82 is connected to the following sensors: a radiation sensor 84 for receiving incident radiation, a pressure sensor 86 for ascertaining the prevailing system pressure, a power sensor 88 for ascertaining the instantaneous generator power, and a rotational speed sensor 90 for ascertaining the generator speed. As actuators, the following elements are controlled by the control means 82, which is controlled by a microprocessor: a power-setting means 92 of the generator 66, the throttle 74, the scavenging blower 76, and the intake/venting valve 78.

The apparatus operates as follows:

As soon as the radiation sensor 84 detects a level of radiation intensity that is sufficient for generating energy, the engine is placed into operation by a non-illustrated starter. At the same time, the scavenging blower 76 starts, so that air flow through the engine is provided. By means of preliminary control values for the throttle 74 and the scavenging blower 76, the operation of the engine is adjusted such that the engine accelerates to a reference speed of rotation of the generator 66, which initially runs in a load-free condition. As soon as this reference speed of rotation, which is sensed by the rotational speed sensor 90, is achieved, the load is increased and is sensed by the power sensor 88. By adjusting the scavenging blower 76, the throttle 74 that sets the system pressure, and the intake/venting valve 78 by means of which air is additionally supplied to, or excess air is released from, the closed system accompanied by the interposition of an air filter, the operation is now controlled in such a way that a maximum power is generated by the generator 66, whereby at the same time predetermined limiting values with regard to final compression temperature, which could be sensed by a further temperature sensor, are maintained in the cylinder 4. It is to be understood that in the event of an excessive through-put of air through the cylinder, the converter is cooled off too rapidly, as a consequence of which the level of efficiency drops, and that with an air through-put that is too low the converter is heated up to an unacceptably high temperature, as a consequence of which the level of efficiency is also diminished since the converter radiates off radiation to the outside. Therefore, with the system pressure and the air through-put two parameters are available that enable operation at a constant speed of rotation, which is required in particular for feeding a main supply system, and the greatest possible level of efficiency. Depending upon the respective requirements, the system pressure can be set to values above or below atmospheric pressure.

Designing the crank drive with the cross head member has the advantage that no lubrication is required within the piston 4, so that the arrangement in the working chamber operates in a wearfree manner over long periods of time. From a thermodynamic standpoint, the described apparatus corresponds substantially to the operation of a two-stroke engine, in which respect heating of the fresh charge is effected not by combustion but rather by the increase in temperature in the converter and as a result takes somewhat longer. It is to be understood that other operating methods could also be adopted.

The described arrangement can be modified in a number of ways. For example, the engine can directly drive a pump or some other mechanical device. For those times where no radiation is available, electrical energy can be stored in a battery or energy can be mechanically stored.

In one practical specific embodiment of the present invention with a single cylinder having a stroke volume of about 350 cc, a converter of about 80 mm diameter and a geometrical compression of the working chamber of about 7:1, wherein the converter substantially completely filled the working chamber at the upper dead center position of the piston, it was already possible to generate electrical energy at a radiation concentration by a factor of about 150.

The inventive method and apparatus are particularly suitable for decentral, possibly power-heat coupled energy supply units that, as measured against photovoltaic installations or installations operating with Stirling engines, involve substantially lower capital investment cost in relation to the useful energy that is produced.

The present invention is, of course, in no way restricted to the specific disclosure of the specification and drawings, but also encompasses any modifications within the scope of the appended claims.

What I claim is:

1. A method of converting radiation power into mechanical power, including the steps of:

providing a piston that is movable in a cylinder to form a variable-sized working chamber;

providing within said working chamber, and connected to one of said cylinder and said pison, a radiation absorber and heat exchanger that is adapted to absorb radiation energy;

during a compression stroke, using said piston to press a gaseous compressible working medium, accompanied by a reduction in the size of said working chamber, into an interior of said radiation absorber heat exchanger that essentially completely accommodates said working medium when said working chamber is at a minimum;

during a working stroke, using said working medium, which has been compressed by said reduction in size of said working chamber and which has been heated up by absorbing thermal energy from said radiation absorber heat exchanger, to move said piston, upon expansion of said working medium, into a position that enlarges said working chamber; and exchanging at least a portion of said working medium following said working stroke and prior to a subsequent compression stroke.

2. A method according to claim 1, which includes the step of providing ambient air as said working medium.

3. A method according to claim 1, which includes the step of using said piston to control a effective cross-sectional area of an inlet port for entry of said working medium into said working chamber at the beginning of compression, and to control a effective cross-sectional area of an outlet port for discharge of said working medium out of said working chamber at the conclusion of expansion.

4. A method according to claim 3, which includes the step of simultaneously opening said inlet port and said outlet port by said piston said piston a position that increases the size of said working chamber to a maximum.

5. A method according to claim 1, which includes the step of varying the amount of said working medium that is exchanged in each working cycle in order to control delivery of mechanical power by said piston.

6. A method according to claim 1, which includes the steps of conducting said working medium in a circuit, and adapting the pressure of said working medium that exists in said circuit to operating parameters.

7. A method according to claim 1, which includes the step of passing said working medium that flows out of said working chamber after a working cycle through a heat exchanger.

8. An apparatus for converting radiation power into mechanical power, comprising:

a cylinder in which, for delivering mechanical power, is disposed a piston that is reciprocally movable for forming a variable-sized working chamber, wherein said cylinder is provided with at least one controllable inlet port and at least one controllable outlet port for the supply and discharge of a gaseous working medium to and from said cylinder respectively, wherein an end face of said cylinder remote that is from said piston is embodied for the introduction of radiation into said cylinder;

a radiation absorber and heat exchanger having a heat exchange surface that is disposed in said working chamber such that when said working chamber is at a minimum said working medium is accommodated essentially entirely in said radiation absorber and heat exchanger; and a scavenging blower disposed in a line conveying said working medium and leading from said outlet port to said inlet port, said scavenging blower serving for an at least partial exchange of said working medium in said working chamber during each working cycle.

9. An apparatus according to claim 8, wherein said end face of said cylinder is closed off by a radiation-transmissive wall means.

10. An apparatus according to claim 9, wherein said radiation absorber and heat exchanger abuts said radiation-transmissive wall means.

11. An apparatus according to claim 9, wherein said radiation absorber and heat exchanger is transmissive for said working medium from a side that faces said piston to a side that faces said radiation-transmissive wall means, and is disposed and constructed in such a way that said working medium flows therethrough during a reduction in volume of said working chamber.

12. An apparatus according to claim 9, wherein said radiation absorber and heat exchanger as is disposed on an end face of said piston.

13. An apparatus according to claim 8, wherein said radiation absorber and heat exchanger is formed by a spiral metal strip having an axis that extends parallel to a longitudinal axis of said cylinder and in which strip is incorporated a corrugated sheet.

14. An apparatus according to claim 8, wherein said radiation absorber and heat exchanger is formed by metal sheets that form between them channels that are open at both ends and that extend parallel to a longitudinal axis of said cylinder.

15. An apparatus according to claim 14, wherein said metal sheets terminate in points in direction toward said end face of said cylinder that is remote from said Piston.

16. An apparatus according to claim 8, wherein said radiation absorber and heat exchanger is formed by an apertured plate that faces said piston and from which plate project bars that are directed toward said end face of said cylinder that is remote from said piston.

17. An apparatus according to claim 16, wherein said bars have a cross-sectional area that decreases in a direction toward said endface of said cylinder that is remote from said piston.

18. An apparatus according to claim 8, wherein said radiation absorber and heat exchanger is formed by a tube bundle.

19. An apparatus according to claim 8, wherein said radiation absorber and heat exchanger is formed by a wire mesh.

20. An apparatus according to claim 8, wherein said radiation absorber and heat exchanger is formed by superimposed apertured metal sheets, the holes of which sheets form through passages that extend parallel to a longitudinal axis of said cylinder.

21. An apparatus according to claim 8, wherein said radiation absorber and heat exchanger contains a wire mesh.

22. An apparatus according to claim 8, wherein said end face of said cylinder is formed by said radiation absorber and heat exchanger, which is provided with bag-like recesses that are disposed next to one another and that alternatingly open out onto an outer side of said cylinder and toward said working chamber.

23. An apparatus according to claim 8, wherein said scavenging blower is driven by movement of said piston.

24. An apparatus according to claim 8, wherein a heat exchanger is disposed in said line leading from said outlet port to said inlet port.

25. An apparatus according to claim 8, wherein a means is provided for varying a velocity of said working medium through said working chamber.

26. An apparatus according to claim 8, wherein a means is provided for varying a pressure level of said working medium.

27. An apparatus according to claim 8, wherein a control means is provided that as a function of incident radiation power regulates at least one of means for controlling velocity of said working medium and means for controlling pressure of said working medium for the supply of maximum power.

* * * * *